United States Patent
Liu et al.

(10) Patent No.: US 10,884,201 B2
(45) Date of Patent: Jan. 5, 2021

(54) RECEPTACLE CONFIGURATION TO SUPPORT ON-BOARD RECEIVER OPTICAL SUBASSEMBLY (ROSA)

(71) Applicant: Applied Optoelectronics, Inc., Sugar Land, TX (US)

(72) Inventors: Kevin Liu, Houston, TX (US); Kai-Sheng Lin, Sugar Land, TX (US); Hao-Chiang Cheng, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 16/053,398

(22) Filed: Aug. 2, 2018

(65) Prior Publication Data
US 2020/0041736 A1    Feb. 6, 2020

(51) Int. Cl.
*G02B 6/36* (2006.01)
*G02B 6/12* (2006.01)
*G02B 6/38* (2006.01)
*G02B 6/42* (2006.01)

(52) U.S. Cl.
CPC ......... *G02B 6/4246* (2013.01); *G02B 6/3839* (2013.01); *G02B 6/4214* (2013.01); *G02B 6/4237* (2013.01); *G02B 6/4257* (2013.01); *G02B 6/4292* (2013.01); *G02B 6/423* (2013.01); *G02B 6/425* (2013.01); *G02B 6/4281* (2013.01)

(58) Field of Classification Search
CPC .. G02B 6/4246; G02B 6/4214; G02B 6/4257; G02B 6/3839; G02B 6/4292; G02B 6/4237; G02B 6/4281; G02B 6/423; G02B 6/425

USPC ......................................... 385/14, 65, 84, 92
See application file for complete search history.

(56) References Cited

U.S. PATENT DOCUMENTS

| | | | | |
|---|---|---|---|---|
| 9,509,433 | B2* | 11/2016 | Ho | H04J 14/0246 |
| 2007/0117458 | A1* | 5/2007 | Winker | G02B 6/4201 |
| | | | | 439/607.01 |
| 2008/0013896 | A1* | 1/2008 | Salzberg | G02B 6/423 |
| | | | | 385/89 |
| 2008/0036103 | A1* | 2/2008 | Ban | G02B 6/4206 |
| | | | | 264/1.25 |
| 2012/0155802 | A1* | 6/2012 | Hsu | G02B 6/4246 |
| | | | | 385/33 |
| 2014/0341513 | A1* | 11/2014 | Lin | G02B 6/4272 |
| | | | | 385/89 |

\* cited by examiner

*Primary Examiner* — Kaveh C Kianni
*Assistant Examiner* — Hung Q Lam
(74) *Attorney, Agent, or Firm* — Grossman Tucker Perreault & Pfleger, PLLC; Norman S. Kinsella

(57) ABSTRACT

The present disclosure is generally directed to an on-board ROSA arrangement where a fiber receptacle element, optical components such as optical de-multiplexer (e.g., an arrayed waveguide grating (AWG)), turning mirror, photodiodes and light receiving chip are mounted to a common substrate. The fiber receptacle element includes a body that defines a slot to at least partially receive an end of the substrate and mount thereto. The body of the fiber receptacle further includes an aperture that extends through the body to receive an optical fiber and/or associated connector and align the same with ROSA components mounted on a surface of the substrate. The fiber receptacle body may be solid, e.g., formed from a single, monolithic piece of material, and may be manufactured from metal, plastic or other suitably rigid material.

15 Claims, 4 Drawing Sheets

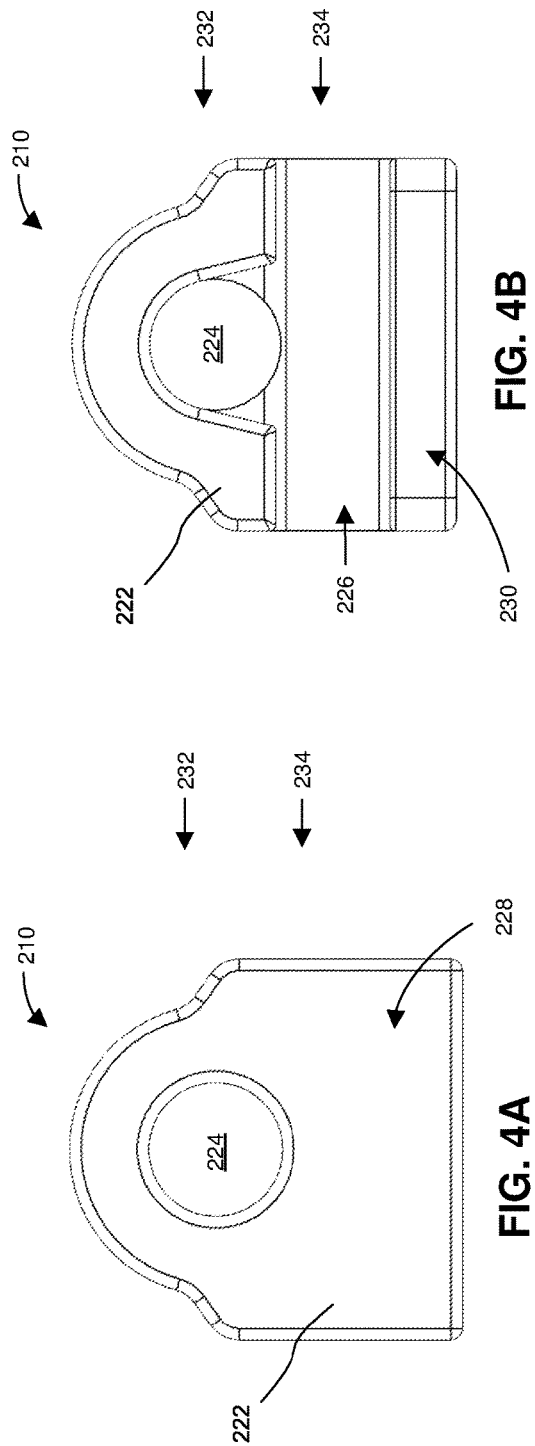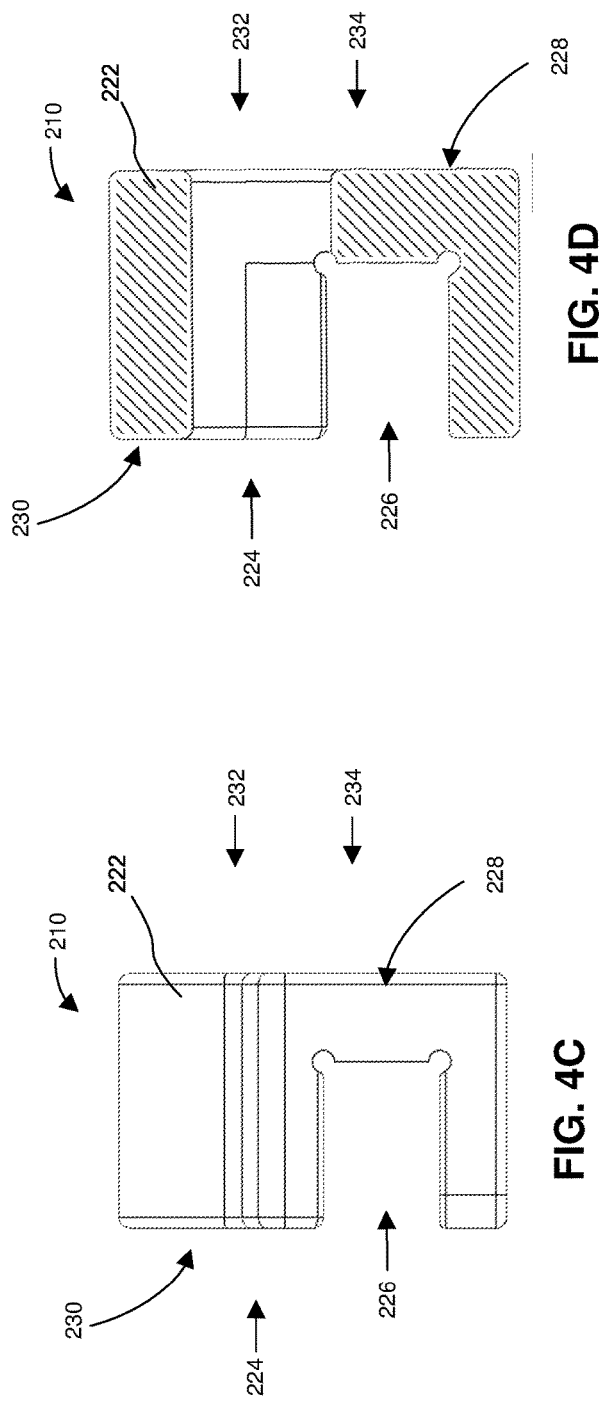

RECEPTACLE CONFIGURATION TO SUPPORT ON-BOARD RECEIVER OPTICAL SUBASSEMBLY (ROSA)

TECHNICAL FIELD

The present disclosure relates to optical communications and more particularly, to a receptacle configuration for an on-board receiver optical subassembly (ROSA).

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more transmitter optical subassemblies (TOSAs) for transmitting optical signals and one or more receiver optical subassemblies (ROSAs) for receiving optical signals. In general, TOSAs include one or more lasers to emit one or more channel wavelengths and associated circuitry for driving the lasers. In general, ROSAs include a demultiplexer and one or more lenses. Existing configurations of optical transceivers include use of TOSAs and ROSAs with separate housings to support transmitting and receiving operations, respectively.

BRIEF DESCRIPTION OF THE DRAWINGS

These and other features and advantages will be better understood by reading the following detailed description, taken together with the drawings wherein:

FIGS. 4A-4D show various views of a fiber coupling receptacle suitable for use with the on-board ROSA arrangement of FIGS. 2-3, consistent with embodiments of the present disclosure.

DETAILED DESCRIPTION

Figure 1:
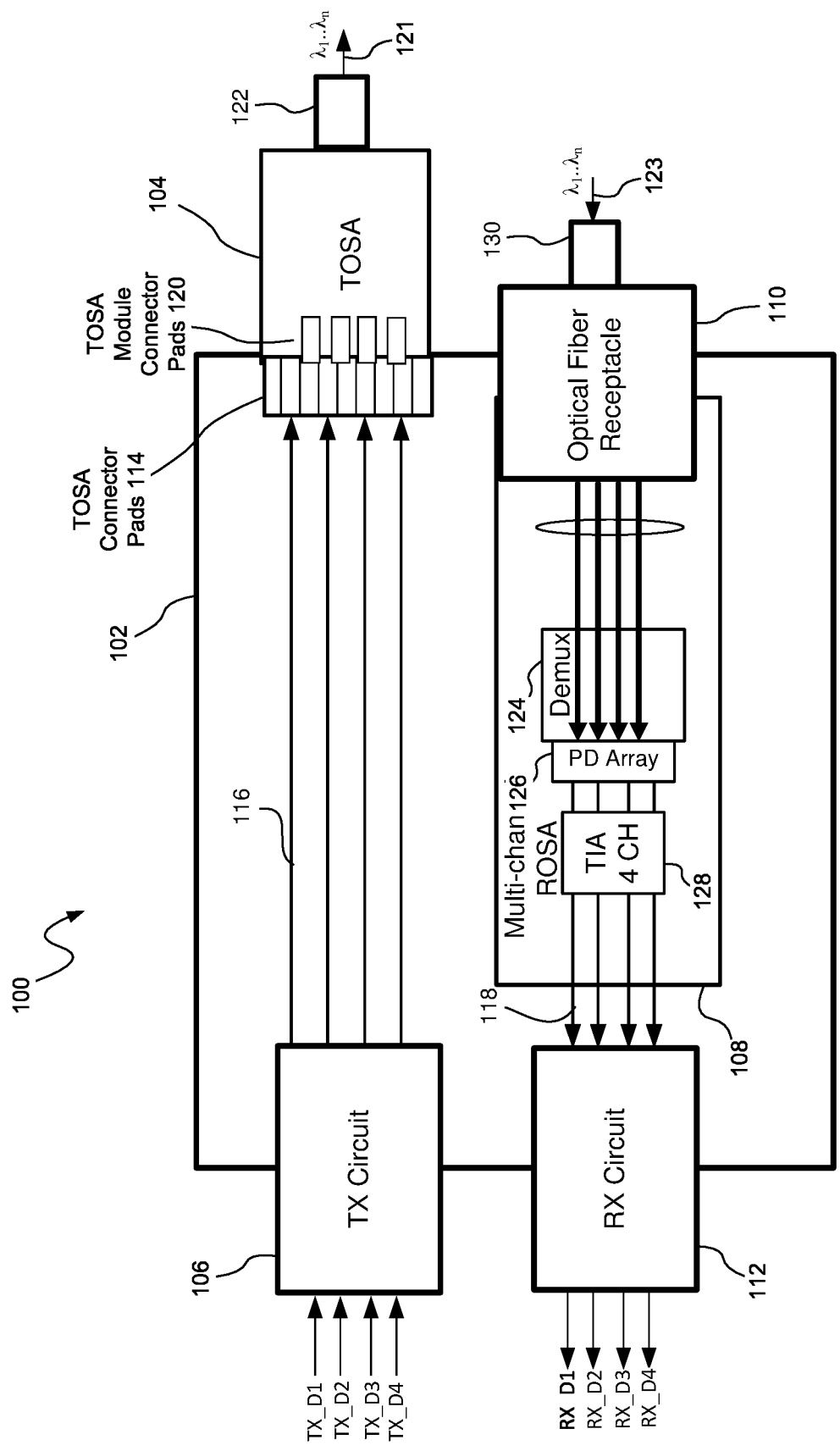
FIG. 1 is a block diagram of a multi-channel optical transceiver, consistent with embodiments of the present disclosure.

Existing approaches to ROSAs include a housing, often made of metal, to hold and align optical components within a cavity of the housing such as filters, mirrors, and other passive and/or active components. ROSA housings can include an optical coupling receptacle at one end for optically coupling the optical components of the ROSA to an optical fiber, e.g., via a ferrule. The optical components may then separate, e.g., de-multiplex, channel wavelengths of an optical signal (e.g., a wavelength division multiplexed (WDM) signal) received via the optical fiber and convert the same into electrical signals. In some cases, the fixed position of the optical coupling receptacle relative to the ROSA housing aids in aligning a received optical signal with the optical components within the ROSA housing to ensure nominal power. Flexible printed circuit boards (PCBs) may then be used to carry the electrical signals representative of received channel wavelengths to associated circuitry. ROSA housings remain an obstacle in the continued scaling of optical subassemblies.

The present disclosure is generally directed to an on-board ROSA arrangement where ROSA components including, for example, a fiber receptacle element, optical components such as optical de-multiplexer (e.g., an arrayed waveguide grating (AWG)), turning mirror, photodiodes and light receiving chip are mounted to a common substrate such as a printed circuit board (PCB). The optical fiber receptacle element, or simply the optical fiber receptacle, includes a body (or base) that defines a slot to at least partially receive an end of the substrate and mount thereto. The body of the fiber receptacle further includes an aperture that extends through the body to receive an optical fiber and/or associated connector and optically align the same with optical components mounted on a surface of the substrate. The fiber receptacle may be welded, glued, or otherwise bonded and mounted to the substrate. The fiber receptacle body may be solid, e.g., formed from a single, monolithic piece of material, and may be manufactured from metal, metal alloy, plastic or other suitably rigid material.

In one specific example embodiment, a multi-channel transceiver module is disclosed. In this embodiment, the multi-channel transceiver module includes a substrate, e.g., a printed circuit board (PCB), with the substrate having at least first and second surfaces disposed opposite each other. A first region of the substrate defines an optical coupling interface and a second region of the substrate defines an electrical coupling region. The optical coupling interface may include pads/terminals for electrically and optically coupling to a transmitter optical subassembly (TOSA), with the TOSA having one or more laser devices, e.g., distributed feedback (DFB) lasers, and associated passive and/or active optical components for combining channel wavelengths and outputting a multiplexed signal, e.g., a WDM signal. The TOSA may include a housing, e.g., formed from metal, that mounts to the substrate by way of wire bonding, solder, glue, and/or any combination thereof. The TOSA housing can define a cavity that provides a light path for multiplexing channel wavelengths into the multiplexed optical signal.

Adjacent the pads/terminals for TOSA module, the optical coupling region may further include pads/terminals for electrically coupling to an on-board ROSA arrangement. The on-board ROSA arrangement may include a welding element with an aperture to provide a fiber coupling receptacle. The welding element includes a body that defines a slot/recess to receive an edge of the substrate and couple, e.g., directly, to the same. The on-board ROSA arrangement may further include a multiplexing chip, turning mirror, light sensitive chips (e.g., photodiode array), and light receiving chip (e.g., TIA) for receiving multiple channel wavelengths and converting the same into respective electrical signals. Each component of the on-board ROSA may then be mounted directly, or indirectly, to one or more surfaces of the substrate.

Thus, the TOSA and on-board ROSA may both electrically couple to a common substrate. This may advantageously eliminate the necessity of a separate and distinct ROSA housing as well as reduce the number of interconnect devices, e.g., other PCBs such as flexible circuit printed circuit boards, for electrically coupling TOSAs/ROSAs to associated circuitry. The common substrate may also shorten the distance between subassembly elements and associated circuitry that by extension reduces time of flight (TOF) for signals thus increasing signaling speed during transmit/receive operations.

The optical fiber coupling receptacle of the on-board ROSA arrangement provides, in a general sense, a "self-aligning" mechanical feature that ensures that the optical fiber coupling receptacle is aligned and fixed about the X and Y and Z axis relative to the other components of the on-board ROSA arrangement. To this end, manufacturing of the optical transceiver module may be simplified and include attaching the on-board ROSA components at pre-determined locations and performing a minimal number of optical power tests to ensure that the position of the optical fiber coupling receptacle relative to the other components of the on-board ROSA components is sufficient to meet nominal power specifications. The optical fiber coupling receptacle of the on-board ROSA arrangement may further provide additional tolerance by function of its slot to allow for relatively minor adjustments to ensure the aperture is in alignment with the multiplexer and other associated components.

As used herein, "on-board" in the context of a ROSA arrangement includes direct or indirect coupling of ROSA components to a common substrate. The components of the ROSA arrangement may be coupled to the same surface, or different surfaces of the same substrate. Likewise, the TOSA components may be coupled to the same or different surfaces of the substrate. In some cases, the substrate may include multiple pieces/segments, and this disclosure is not intended to be limited to a single substrate.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Referring to the Figures, FIG. 1 illustrates an optical transceiver 100, consistent with embodiments of the present disclosure. The optical transceiver 100 is shown in a highly simplified form for clarity and ease of explanation. In this embodiment, the optical transceiver 100 transmits and receives four (4) channels using four different channel wavelengths ($\lambda 1$, $\lambda 2$, $\lambda 3$, $\lambda 4$) and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in internet data center applications or fiber to the home (FTTH) applications.

The optical transceiver 100 may include a number of components to support transceiver operations. The optical transceiver 100 may include an optical transceiver substrate 102, a transmitter optical subassemblies (TOSA) module 104 for transmitting optical signals on different channel wavelengths, transmit connecting circuit 106, a multi-channel receiver optical subassembly (ROSA) 108 for receiving optical signals on different channel wavelengths, an optical fiber receptacle 110 to receive and align a fiber connector (e.g., a ferrule) with the ROSA, and a receiver connecting circuit 112.

The optical transceiver substrate 102 includes traces, connector pads, and other circuitry to support transceiver operations. The optical transceiver substrate 102 may include TOSA connector pads 114 (or terminals 114) that enable the TOSA module 104 to mount and electrically couple to the optical transceiver substrate 102. The optical transceiver substrate 102 may include traces 116 that couple the TOSA connector pads 114 to the transmit connecting circuit 106. The optical transceiver substrate 102 may include traces 118 that electrically couple the ROSA 108 to the receiver connecting circuit 112. The optical transceiver substrate 102 may be manufactured from a multi-layer printed circuitry board (PCB), although other types of substrates may be utilized and are within the scope of this disclosure.

The TOSA module 104 may be configured to receive driving electrical signals (TX_D1 to TX_D4), convert the electrical signals to a multiplexed optical signal (e.g., a signal with channel wavelengths $\lambda_1 \ldots \lambda_n$) and launch the same via a transmit optical fiber 121. The TOSA module 104 may be electrically coupled to the TOSA connector pads 114 and to the traces 116 through TOSA module connector pads 120. The TOSA module 104 may further include a receptacle for optically coupling to the transmit optical fiber 121. The TOSA module 104 may include a housing that defines a cavity, with the cavity having filters, mirrors and other active/passive optical components for combining channel wavelengths to output a multiplexed optical signal.

The multi-channel ROSA 108 includes an optical demultiplexer 124, a photodetector array 126 (e.g., photodiodes), and a trans-impedance amplifier (TIA) 128 for converting optical signals into electrical signals. The optical demultiplexer 124 receives the optical signal from the receive optical fiber 123, which is received and aligned by mechanical function of the optical fiber receptacle 110, as discussed in greater detail below. The optical demultiplexer 124 is optically coupled to the photodetector array 126 (e.g., by use of an optional turning mirror), which is electrically coupled to the trans-impedance amplifier 128, to provide electrical signals (RX_D1 to RX_D4) to the receiver connecting circuit 112. Other embodiments of a ROSA may also be used in the optical transceiver 100 for receiving and detecting one or more different optical signals.

The receiver connecting circuit 112 is electrically connected to the electronic components (e.g., the laser, monitor photodiode, etc.) in the ROSA 108. The receiver connecting circuit 112 can include conductive paths to provide electrical connections and may also include additional circuitry.

The optical fiber receptacle 110 couples and aligns the ROSA arrangement 108 with an optical fiber within the optical fiber ferrule 130, according to an embodiment. The optical fiber receptacle 110 may be securely attached to the optical transceiver substrate 102 via welding, soldering, and/or an adhesive. As shown in further detail in FIGS. 2, 3, and 4A-4D, the optical fiber receptacle 110 may include an aperture for receiving and aligning the optical fiber ferrule 130, and by extension the receive optical fiber 123, with the ROSA arrangement 108. The optical fiber receptacle 110 may also include a slot/groove that is formed to receive at least part of the optical transceiver substrate 102. The slot of the optical fiber receptacle 110 may be configured to make contact with a first (top) surface and a bottom (second) surface of the optical transceiver substrate 102 for mounting purposes. The optical fiber receptacle 110 may at least partially be manufactured from metal to facilitate welding or soldering to the optical transceiver substrate 102.

Figure 2:
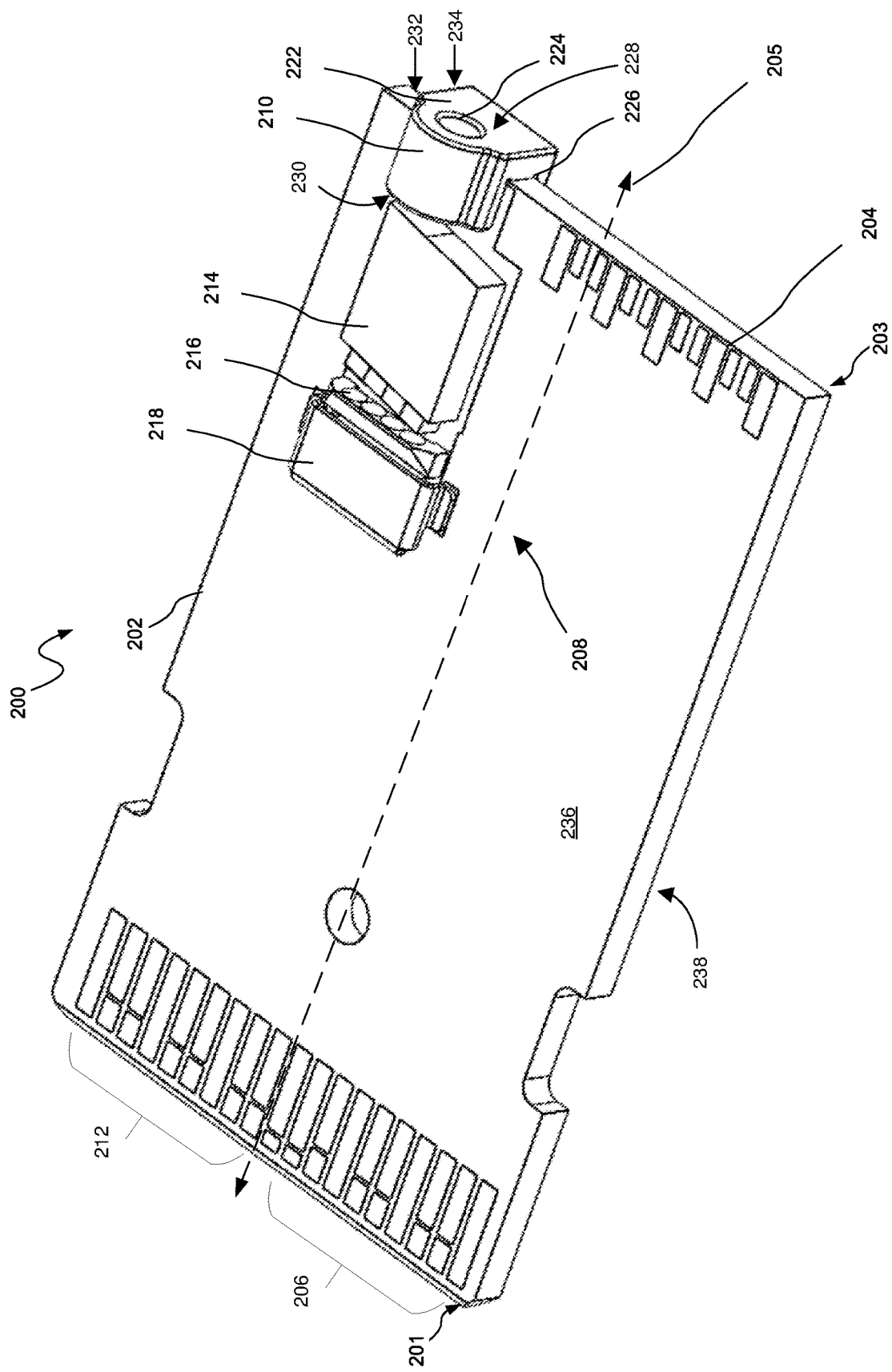
FIG. 2 is a perspective view of a multi-channel optical transceiver having an on-board receiver optical subassembly (ROSA) arrangement, consistent with embodiments of the present disclosure.
Figure 3:
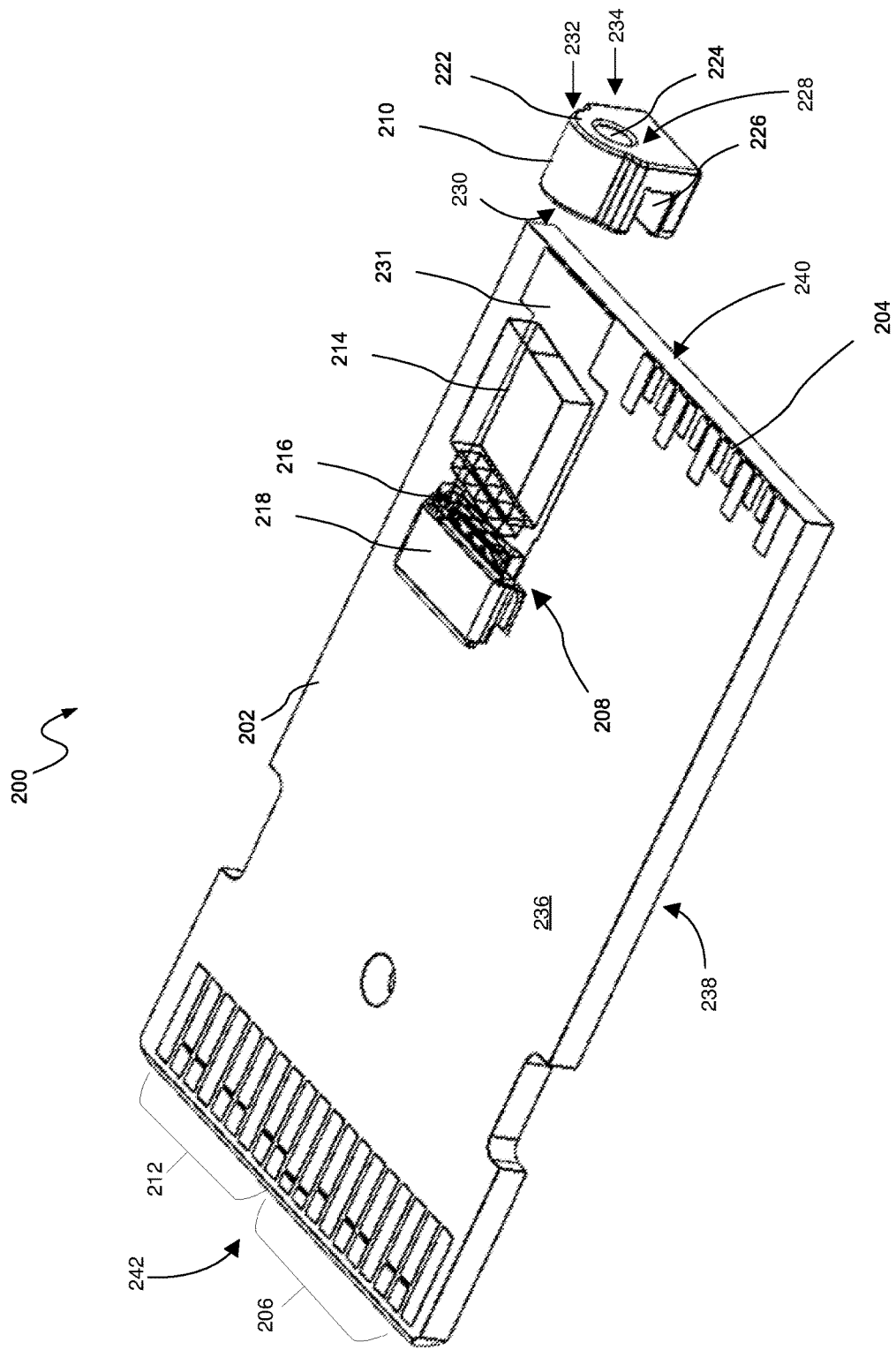
FIG. 3 is a partially-exploded perspective view of the multi-channel optical transceiver of FIG. 2, consistent with embodiments of the present disclosure.

FIGS. 2 and 3 illustrate a perspective view and a partially exploded perspective view of an optical transceiver 200, consistent with embodiments of the present disclosure. The optical transceiver 200 is an example of an implementation of the optical transceiver 100, according to an embodiment. The optical transceiver 200 generally includes an optical transceiver substrate 202, TOSA connector pads 204 for electrically coupling to a TOSA module, transmit connector pads 206, an on-board ROSA arrangement 208 for receiving an optical signal having different channel wavelengths, an optical fiber receptacle 210 to receive and align an optical fiber ferrule with the ROSA arrangement 208, and receiver connector pads 212. The on-board ROSA arrangement may also be referred to herein as simply a ROSA arrangement. The optical transceiver substrate, or simply the substrate, includes a first end 201 that extends to a second end 203 along a longitudinal axis 205. The first end 201 includes a region for electrically coupling to transmit and/or receiver circuitry and the second end 203 includes a region for optically coupling with the TOSA and on-board ROSA arrangement. Thus, the first end 201 may be accurately referred to as an electrical coupling end and the second end 203 may be accurately referred to as an optical coupling end.

The multi-channel ROSA arrangement 208 includes an optical demultiplexer 214, a turning mirror 216, an array of photodiodes (not shown) and a multi-channel trans-impedance amplifier (TIA) 218 for converting optical signals into electrical signals. The optical demultiplexer 124 receives the optical signals from an optical fiber, e.g., the receive optical fiber 123, and separates channel wavelengths from an optical signal. The separated channel wavelengths may then be provided to the array of photodiodes by way of the turning mirror 216. The TIA 218 may then be used in combination with the array of photodiodes to convert the detected channel wavelengths into electrical signals during receive operations. The electrical signals may then be provided to associated circuitry via the pads/terminals 212.

As previously discussed, the optical fiber receptacle 210 includes structure that enables the same to receive and align an optical fiber with the ROSA arrangement 208. The optical fiber receptacle 210 includes a body 222, an aperture 224 formed through the body 222, and a slot 226 formed in the body 222 to couple the optical fiber receptacle 210 to the optical transceiver substrate 202. The body 222 formed from a single or multiple pieces of plastic, metal, or other suitably ridged material. The body 222 may include an upper portion 232 that may be generally arcuate which may then transition to a bottom portion 234 that may be substantially rectangular.

The slot 226 and the optical fiber receptacle 210 may be configured to be mounted to a second end 203 of the optical transceiver substrate 202. The first end 201 of the optical transceiver substrate 202 is opposite to a second end 203 of the optical transceiver substrate 202.

The aperture 224 may extend from a first surface 228 of the body 222 through to a second surface 230 of the body 222. Therefore, the aperture 224 may be described as a through hole. The aperture 224 may include a generally cylindrical shape, as shown, or may have a different shape depending on a desired configuration/connector type. The slot 226 may be formed in the second surface 230 of the body 222. The slot 226 may be configured to partially contact (e.g., directly) or be adhered to a first surface 236 of the optical transceiver substrate 202 and a second surface 238 of the optical transceiver substrate 202. In some cases, such as shown in FIG. 3, the slot 226 may be configured to mount to a pad 231 of the substrate 202. In this example, the body 222 may then be welded to the pad 231 to further increase structural stability. An additional pad, not shown, may be opposite of the pad 231 on the second surface 238 and may also be used to weld the body 222 to the second surface 238 of the substrate 202.

FIGS. 4A, 4B, 4C, and 4D illustrate various views of the optical fiber receptacle 210, consistent with embodiments of the present disclosure. FIG. 4A illustrates a front view of the optical fiber receptacle 210. FIG. 4B illustrates a rear view of the optical fiber receptacle 210. FIG. 4C illustrates a side view of the optical fiber receptacle 210. FIG. 4D illustrates a cross sectional side view of the optical fiber receptacle 210.

One aspect of the present disclosure includes an optical fiber receptacle for coupling to an optical transceiver substrate. The optical fiber receptacle including a body, an aperture defined by the body and extending therethrough, the aperture configured to receive and couple to an optical fiber ferrule, and a slot defined by the body, the slot extending substantially transverse relative to the aperture, the slot configured to at least partially receive a portion of the optical transceiver substrate and couple thereto, and wherein the aperture is configured to optically align with receiver optical subassembly (ROSA) components disposed on a surface of the optical transceiver substrate when the slot of the body is coupled to the optical transceiver substrate.

In accordance with another aspect of the present disclosure a substrate defined by first and second surfaces disposed opposite each other is disclosed. The substrate including a receiver optical subassembly (ROSA) arrangement disposed on the first surface of the substrate, the ROSA arrangement to receive a multi-channel optical signal and output an electrical signal representative of each channel wavelength of the multi-channel signal, and an optical fiber receptacle coupled to an end of the substrate, wherein the optical fiber receptacle includes a body, an aperture defined by the body and extending therethrough, the aperture configured to receive and couple to an optical fiber ferrule, and a slot defined by the body, the slot extending substantially transverse relative to the aperture, the slot configured to at least partially receive a portion of the optical transceiver substrate and couple thereto, and wherein the aperture is configured to optically align with the ROSA arrangement disposed on a surface of the optical transceiver substrate when the slot of the body is coupled to the optical transceiver substrate, and a transmitter optical subassembly (TOSA) mounted to the substrate.

While the principles of the invention have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A optical fiber receptacle for coupling to an optical transceiver substrate, comprising:
    a body;
    an aperture defined by the body and extending therethrough, the aperture being a through hole with a generally cylindrical shape and configured to receive and couple to an optical fiber ferrule of an optical fiber; and
    a slot defined by the body, the slot extending substantially transverse relative to the through hole, the slot configured to at least partially receive a portion of the optical transceiver substrate that includes first and second surfaces disposed opposite each other to couple the optical transceiver substrate to the body,
    wherein the through hole is configured to receive the optical fiber ferrule and optically align light emitted by the optical fiber with receiver optical subassembly (ROSA) components disposed on the first surface of the optical transceiver substrate when the optical transceiver substrate is received within the slot and coupled to the body, and wherein the through hole optically aligns light emitted by the optical fiber with the ROSA components disposed on the first surface of the optical transceiver substrate based at least in part on the through hole extending through the body along a longitudinal axis that is substantially parallel to the first surface of the optical transceiver substrate such that the light emitted by the optical fiber travels along the longitudinal axis and intersects with at least one component of the ROSA components.

2. The optical fiber receptacle of claim 1, wherein the body is configured to directly contact at least two surfaces of the optical transceiver substrate when the optical transceiver substrate is disposed within the slot.

3. The optical fiber receptacle of claim 1, wherein the body is formed form a single, monolithic piece of material.

4. The optical fiber receptacle of claim 1, wherein the body includes an arcuate region, the arcuate region defining at least a portion of the aperture.

5. The optical fiber receptacle of claim 1, wherein at least a portion of the body includes a rectangular shape.

6. The optical fiber receptacle of claim 1, wherein the body is formed from a metal or metal alloy.

7. An optical transceiver comprising:
    a substrate defined by first and second surfaces disposed opposite each other;
    a receiver optical subassembly (ROSA) arrangement disposed on the first surface of the substrate, the ROSA arrangement to receive a multi-channel optical signal and output an electrical signal representative of each channel wavelength of the multi-channel signal; and
    an optical fiber receptacle coupled to an end of the substrate, wherein the optical fiber receptacle includes:
        a body;
        an aperture defined by the body and extending therethrough, the aperture being a through hole with a generally cylindrical shape and configured to receive and couple to an optical fiber ferrule of an optical fiber; and
        a slot defined by the body, the slot extending substantially transverse relative to the through hole, the slot configured to at least partially receive a portion of the substrate that includes the first and second surfaces to couple the substrate to the body, and wherein the through hole is configured to receive the optical fiber ferrule and optically align light emitted by the optical fiber with the ROSA arrangement disposed on the first surface of the substrate based at least in part on the through hole extending through the body along a longitudinal axis that is substantially parallel to the surface of the substrate when the substrate is received within the slot and coupled to the body such that the light emitted by the optical fiber travels along the longitudinal axis and intersects with at least one component of the ROSA arrangement disposed on the first surface of the substrate; and
    a transmitter optical subassembly (TOSA) mounted to the substrate.

8. The optical transceiver of claim 7, wherein the optical fiber receptacle is directly coupled to the first and second surfaces of the substrate.

9. The optical transceiver of claim 7, wherein the optical fiber receptacle is welded to a pad of the first and/or second surface of the substrate.

10. The optical transceiver of claim 7, wherein the body of the optical fiber receptacle includes a rectangular portion that transitions to a substantially arcuate region, and wherein the arcuate region defines at least a portion of the aperture.

11. The optical transceiver of claim 7, wherein the substrate includes a plurality of transmitter optical subassembly (TOSA) connector pads electrically coupled to the TOSA.

12. The optical transceiver of claim 7, wherein the ROSA arrangement includes an optical demultiplexer, a plurality of photodiodes optically coupled to the demultiplexer, and associated circuitry coupled to the plurality of photodiodes, and wherein each of the optical demultiplexer, the plurality of photodiodes and associated circuitry are mounted to the first surface of the substrate.

13. The optical fiber receptacle of claim 1, wherein the through hole is not in communication with the slot in response to the slot receiving the portion of the optical transceiver substrate that includes the first and second surfaces.

14. The optical fiber receptacle of claim 1, wherein the slot defined by the body is further configured to receive an end of the optical transceiver substrate to mount the body to the optical transceiver substrate.

15. The optical fiber receptacle of claim 14, wherein the slot defined by the body is further configured to, in response to receiving the end of the optical transceiver substrate, cause the longitudinal axis of the through hole to extend substantially parallel to the surface of the optical transceiver substrate on which the ROSA components are disposed.

* * * * *